United States Patent
Ando

(10) Patent No.: US 7,348,547 B2
(45) Date of Patent: Mar. 25, 2008

(54) POSITION DETECTING APPARATUS AND IMAGE PROCESSING APPARATUS PROVIDED WITH THE SAME

(75) Inventor: Masao Ando, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 75 days.

(21) Appl. No.: 11/365,307

(22) Filed: Feb. 28, 2006

(65) Prior Publication Data

US 2007/0200076 A1   Aug. 30, 2007

(51) Int. Cl.
*G01D 5/34*   (2006.01)

(52) U.S. Cl. ............... 250/231.13; 356/617; 341/13

(58) Field of Classification Search ........... 250/231.13, 250/231.14, 231.18; 356/617, 620; 341/9, 341/11, 13, 15, 97, 98
See application file for complete search history.

(56) References Cited

U.S. PATENT DOCUMENTS 4,644,322 A    2/1987  Fujita 5,017,972 A    5/1991  Daughton
6,885,321 B1 *  4/2005  Blaum et al. ............... 341/98

FOREIGN PATENT DOCUMENTS

| JP | 2-22570 | 5/1990 |
| JP | 4-226253 | 8/2002 |
| JP | 2002-332120 | 11/2002 |

* cited by examiner

*Primary Examiner*—Kevin Pyo
(74) *Attorney, Agent, or Firm*—SoCal IP Law Group LLP; Steven C. Sereboff

(57) ABSTRACT

There is provided a position detecting apparatus that has a high ability of detecting a correct position even if there is mechanical play in a moving mechanical member, a position of which is detected, and an image processing apparatus provided with the position detecting apparatus. In a position detecting apparatus 100 of the invention, even if there is a certain degree of play in a slide plate 11 that moves in a slide direction DN and reading by bit mark reading sensors 21 to 24 deviates from regular reading of binary numbers, since binary numbers appended to a surface of the slide plate is formed by gray codes, a position derived by a position deriving unit is more likely to be controlled to be as small as adjacent binary numbers with respect to a slide direction of the slide plate compared with the case of the conventional simple binary numbers.

12 Claims, 9 Drawing Sheets

FIG.2

| STEP POSITION P | USUAL BINARY NUMBER | GRAY CODE |
|---|---|---|
| 0 | 0 0 0 0 | 0 0 0 0 |
| 1 | 0 0 0 1 | 0 0 0 1 |
| 2 | 0 0 1 0 | 0 0 1 1 |
| 3 | 0 0 1 1 | 0 0 1 0 |
| 4 | 0 1 0 0 | 0 1 1 0 |
| 5 | 0 1 0 1 | 0 1 1 1 |
| 6 | 0 1 1 0 | 0 1 0 1 |
| 7 | 0 1 1 1 | 0 1 0 0 |
| 8 | 1 0 0 0 | 1 1 0 0 |
| 9 | 1 0 0 1 | 1 1 0 1 |
| 10 | 1 0 1 0 | 1 1 1 1 |
| 11 | 1 0 1 1 | 1 1 1 0 |
| 12 | 1 1 0 0 | 1 0 1 0 |
| 13 | 1 1 0 1 | 1 0 1 1 |
| 14 | 1 1 1 0 | 1 0 0 1 |
| 15 | 1 1 1 1 | 1 0 0 0 |

| | | | | |
|---|---|---|---|---|
| STEP P0 | 0 | 0 | 0 | 0 |
| STEP P1 | 0 | 0 | 0 | 1 |
| STEP P2 | 0 | 0 | 1 | 1 |
| STEP P3 | 0 | 0 | 1 | 0 |
| STEP P4 | 0 | 1 | 1 | 0 |
| STEP P5 | 0 | 1 | 1 | 1 |
| STEP P6 | 0 | 1 | 0 | 1 |
| STEP P7 | 0 | 1 | 0 | 0 |
| STEP P8 | 1 | 1 | 0 | 0 |
| STEP P9 | 1 | 1 | 0 | 1 |
| STEP P10 | 1 | 1 | 1 | 1 |
| STEP P11 | 1 | 1 | 1 | 0 |
| STEP P12 | 1 | 0 | 1 | 0 |
| STEP P13 | 1 | 0 | 1 | 1 |
| STEP P14 | 1 | 0 | 0 | 1 |
| STEP P15 | 1 | 0 | 0 | 0 |
| | BA4 | BA3 | BA2 | BA1 |

FA

| | BA3 | BA2 | BA1 | BA4 |
|---|---|---|---|---|
| STEP P0 | 0 | 0 | 0 | 0 |
| STEP P1 | 0 | 0 | 1 | 0 |
| STEP P2 | 0 | 1 | 1 | 0 |
| STEP P3 | 0 | 1 | 0 | 0 |
| STEP P4 | 1 | 1 | 0 | 0 |
| STEP P5 | 1 | 1 | 1 | 0 |
| STEP P6 | 1 | 0 | 1 | 0 |
| STEP P7 | 1 | 0 | 0 | |
| STEP P8 | 1 | 0 | 0 | |
| STEP P9 | 1 | 0 | 1 | |
| STEP P10 | 1 | 1 | 1 | 1 |
| STEP P11 | 1 | 1 | 0 | 1 |
| STEP P12 | 0 | 1 | 0 | 1 |
| STEP P13 | 0 | 1 | 1 | 1 |
| STEP P14 | 0 | 0 | 1 | 1 |
| STEP P15 | 0 | 0 | 0 | 1 |

| STEP POSITION P | USUAL BINARY NUMBER | | | |
|---|---|---|---|---|
| 0 · · · · | 0 | 0 | 0 | 0 |
| 1 · · · · | 0 | 0 | 0 | 1 |
| 2 · · · · | 0 | 0 | 1 | 0 |
| 3 · · · · | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 · · · · | 1 | 1 | 1 | 1 |

FIG. 12

Prior Art

POSITION DETECTING APPARATUS AND IMAGE PROCESSING APPARATUS PROVIDED WITH THE SAME

BACKGROUND OF THE INVENTION

1. Field of the Invention

The present invention relates to a position detection technology, and, more particularly to a position detecting apparatus that can automatically detect, when an original sheet or the like is conveyed while sliding in a state in which both side edges in a paper width direction thereof are in contact with a guide, width of the original sheet or the like from a position of the guide and an image processing apparatus provided with the position detecting apparatus.

2. Description of the Related Art

Conventionally, in the position detecting apparatus of this type, switches or sensors that can represent two values are arranged in a reading position as means for detecting a position of a mechanical member that mechanically moves. In this case, the number of the switches or sensors arranged corresponds to resolution (digits) required for position detection. FIG. 11 is a perspective view simply showing a position detecting apparatus 500 that is used for paper width detection used in a copying machine and the like. This position detecting apparatus 500 includes a slide plate 51, a sheet guide 52 fixed at one end of the slide plate 51, bit mark reading sensors 61 to 64 (in this example, reflection sensors are used) arranged in a reading position near the other end of the slide plate 51, and a not-shown position deriving unit made of an electronic circuit.

The slide plate 51 serving as a moving mechanical member is constituted to be capable of sliding in a direction indicated by an arrow DN. In this example, binary numbers of four digits are appended to a lower surface of the slide plate 51. In this case, the binary numbers are represented by white or black marks (bit marks) in association with logics of respective bits of the binary numbers. Bit marks of the respective digits of the binary numbers are appended at equal intervals in a direction orthogonal to the slide direction. Bit marks of an identical digit of the respective binary numbers are appended at fixed pitches (referred to as steps P0 to P15) in a linear shape along the slide direction DN.

In other words, the respective bits of the binary numbers are arranged at intersections of four imaginary straight lines that extend at equal intervals in the slide direction on the surface of the slide plate and sixteen imaginary straight lines that are orthogonal to the four imaginary straight lines and extend at intervals of fixed pitches. In the positions of the respective bits, "1" is displayed as a white bit mark and "0" is displayed as a black bit mark. It goes without saying that other colors may be used as long as the binary numbers can be digitally displayed.

In the case of FIG. 11, a not-shown fixed wall is provided at the other end of the slide plate 51. An original sheet or the like to be copied is placed between the sheet guide 52 and the fixed wall. The sheet guide 52 is slid in the direction of the arrow DN. Both side edges of the original sheet are brought into contact with the sheet guide 52 and the fixed wall, respectively. In other words, the original sheet is held to be capable of slidingly moving between the sheet guide 52 and the fixed wall. In the case in which the position detecting apparatus 500 is operating, when the slide plate 51 is slid and a position of the sheet guide 52 is set to width of the original sheet, the sensors 61 to 64 read logics indicated by bit marks of the slide plate 51 facing the sensors 61 to 64. The not-shown position deriving unit derives, on the basis of the logics read by the sensors 61 to 64, positions of the steps P0 to P15 indicated by binary numbers represented by the bit marks read. A host apparatus determines, for example, width of the held original sheet or the like on the basis of a result of the derivation.

In the example described above, positions of the slide plate 51 are represented by the bit marks of the binary numbers. However, as shown in FIG. 12, the binary numbers are simple ones obtained by directly using usual binary numbers. Overall display by the bit marks appended to the surface of the slide plate 51 is referred to as a bit matrix. When logics indicated by two bit marks that belong to a same digit of the binary numbers in the bit matrix and are adjacent to each other in a front-to-back direction with respect to the slide direction of the slide plate 51 are opposite, a point between these bit marks is referred to as a bit change point.

In the case of FIG. 12, there are plural bit change points (indicated by underlines in FIG. 12) where plural bits in the binary numbers adjacent to each other with respect to the slide direction of the slide plate 51 simultaneously change. Therefore, when the moving mechanical member stops at a bit change point or near the bit change point, it is impossible to decide values of which bits are adopted before and after the change points. In this case, depending on a combination of values of bits adopted, the mechanical member (the slide plate 51) is likely to be recognized as stopping in a position distant apart from a position where the mechanical member actually stops.

As described above, in the conventional position detecting apparatus, when the moving mechanical member (e.g., the slide plate 51) stops near the bit change points, it is impossible to decide which values are adopted before and after the respective bit change points. In such a case, the mechanical member is likely to be recognized as stopping in a position distant apart from a position where the mechanical member actually stops. For example, in the case of FIG. 12, when it is assumed that a position where the mechanical member stops facing the sensors 61 to 64 is between the step P7 (0111) and the step P8 (1000) of the slide plate 51, it is likely that bits of all the digits are read as "1" or "0". In other words, it is impossible to decide which of binary numbers (0000) to (1111) the position takes. Thus, in order to eliminate this uncertainty, conventionally, respective sensors are accurately arranged such that changes of bits are always performed simultaneously or machining accuracy is improved to prevent play (back-lash) from occurring in a moving mechanism. Alternatively, complicated measures are taken. For example, a latch mechanism or the like is used such that the mechanical member such as the slide plate 51 stops only in a regular position of binary numbers without stopping at the bit change points.

Related techniques are disclosed in JP-B-2-22570 (gray codes are used for A/D conversion) and JP-A-2002-332120 (a mechanism of a slide plate).

SUMMARY OF THE INVENTION

The invention has been devised in order to solve the problems described above and it is an object of the invention to provide a position detecting apparatus that can hold down an error of reading without significantly increasing machining accuracy even if binary numbers, which are appended to a moving mechanical member in order to indicate a position of the mechanical member, reach an irregular reading position and are read by mistake and an image processing apparatus provided with the position detecting apparatus.

In order to solve the problems, a position detecting apparatus according to the invention includes: a mechanical member that moves in a direction set in advance; bit marks that indicate values of respective digits of binary numbers formed by gray codes appended at predetermined pitches to a surface of the mechanical member in order to indicate respective positions of the mechanical member with respect to the moving direction of the mechanical member; bit mark reading sensors arranged to be capable of simultaneously reading, every time the bit marks indicating the binary numbers formed by the gray codes appended to the surface of the mechanical member reach a reading position, the bit marks of the respective digits that reach the reading position; and a position deriving unit that derives a position of the mechanical member from values indicated by the bit marks of the respective digits obtained when the bit mark reading sensors simultaneously read the bit marks that reach the reading position.

If the position detecting apparatus is constituted as described above, even if there is certain degree of play in the moving mechanical member and reading by the bit mark reading sensors is wrong, since the binary numbers appended to the surface of the mechanical member are using the gray codes, a position derived by the position deriving unit is more likely to be controlled to be as small as adjacent binary numbers with respect to the moving direction of the mechanical member compared with the case of the conventional simple binary numbers.

In the position detecting apparatus of the invention, it is preferable that the bit marks indicating the respective digits of the binary numbers are appended at equal intervals in a direction orthogonal to the moving direction of the mechanical member and the bit marks are also appended at equal intervals for each of the digits of the binary numbers along the moving direction of the mechanical member.

In the position detecting apparatus of the invention, it is preferable that, when overall display by the bit marks appended to the surface of the mechanical member is a bit matrix and logics indicated by two bit marks that belong to a same digit of the binary numbers in the bit matrix and are adjacent to each other in a front-to-back direction with respect to the moving direction of the mechanical member are opposite, assuming that a point between these bit marks is a bit change point, a straight line connecting a first bit change point that belongs to a first digit and a second bit change point that belongs to a second digit different from the first digit and is adjacent to the first bit change point in the front-to-back direction with respect to the moving direction of the mechanical member is an inter-mark connection slanted line, and an angle formed by the inter-mark connection slanted line and a straight light orthogonal to the moving direction of the mechanical member is a counter malfunction angle, a smallest counter malfunction angle in one bit matrix is set as a minimum counter malfunction angle, minimum counter malfunction angles in all new bit matrixes created by replacing a bit string of any one of the digits with a bit string of the other digits are compared, a bit matrix having a minimum counter malfunction angle larger than minimum counter malfunction angles of the other bit matrix is selected as an optimum bit matrix, and the optimum bit matrix selected is appended to the surface of the mechanical member.

In the position detecting apparatus of the invention, it is preferable that, when plural optimum bit matrixes are present, a bit matrix further having no bit mark on the inter-mark connection slanted line is selected more preferentially than a bit matrix further having a bit mark on the inter-mark connection slanted line.

In the position detecting apparatus of the invention, it is preferable that, when overall display of bit marks appended to the surface of the mechanical member is a bit matrix and logics indicated by two bit marks that belong to a same digit of binary numbers in the bit matrix and are adjacent to each other in a front-to-back direction with respect to the moving direction of the mechanical member are opposite, assuming that a point between the bit marks is a bit change point, a bit matrix with bit strings replaced is appended to the surface of the mechanical member, the bit strings being replaced such that a first bit string having a largest number of bit change points and a second bit string having a second largest number of bit change points among bit strings of the respective digits of the binary numbers are arranged to be adjacent to each other and a third bit string having a third largest number of bit change points is arranged on a side opposed to the second bit string with the first bit string in the center and such that the bit strings occupy a position close to the first bit string in order from a bit string having a largest number of bit change points.

In the position detecting apparatus of the invention, it is preferable that the mechanical member is a flat slide plate, the bit marks are colored in white or black according to logics that should be displayed, and the bit mark reading sensors that read the bit marks are reflection sensors.

In the position detecting apparatus of the invention, it is preferable that the mechanical member is a rotating body of a drum shape that rotates around a center axis, bit marks appended to a surface of the rotating body are colored in white or black according to logics that should be displayed, and the bit mark reading sensors that read the bit marks are reflection sensors.

In the position detecting apparatus of the invention, it is preferable that mounting means, for example mounting means 125 as seen in FIG. 1, for making it possible to mount the position detecting apparatus on an image processing apparatus to use the position detecting apparatus as a sheet width detecting apparatus for a sheet to be subjected to image processing in the image processing apparatus is attached to the position detecting apparatus.

DESCRIPTION OF THE DRAWINGS

In the accompanying drawings:

FIG. 2 is a table showing binary numbers formed by gray codes, which are appended to a surface of a slide plate shown in FIG. 1 in association with steps indicating positions of the slide plates, in comparison with usual binary numbers;

FIG. 6 is a diagram for explaining a minimum counter malfunction angle in the case in which bit strings of binary numbers of five digits are not rearranged in a bit matrix that uses gray codes;

FIG. 7 is a diagram for explaining a minimum counter malfunction angle in the case in which a bit string in a first digit is rearranged to a position between a third digit and a fourth digit in the bit matrix in FIG. 6;

FIG. 8 is a diagram for explaining a minimum counter malfunction angle in the case in which the bit strings are further rearranged in the bit matrix in FIG. 7;

FIG. 12 is a diagram for explaining binary numbers appended to a slide plate in FIG. 11.

DESCRIPTION OF THE EMBODIMENTS

Embodiments of the invention will be hereinafter explained with reference to the drawings.

Figure 1:
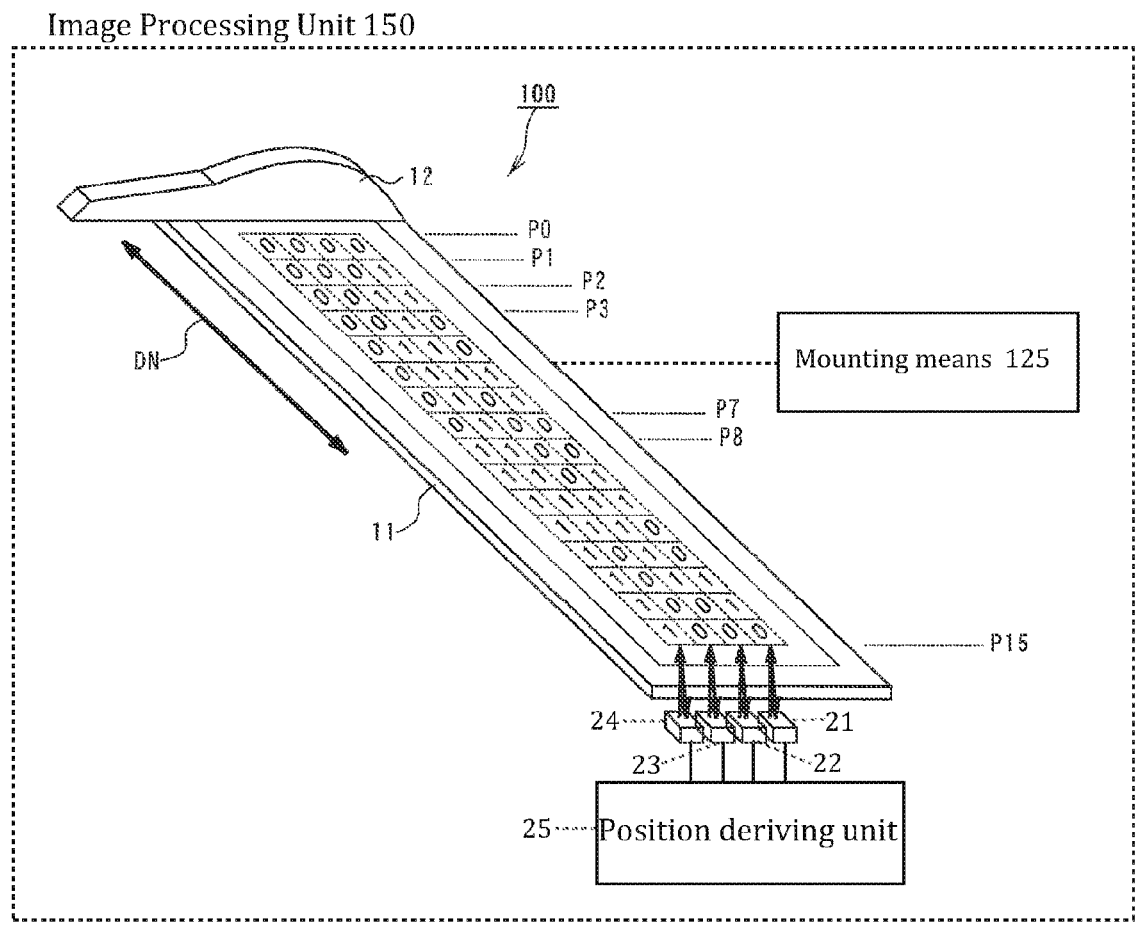
FIG. 1 is a diagram showing an embodiment of a position detecting apparatus of the invention.
Figure 11:
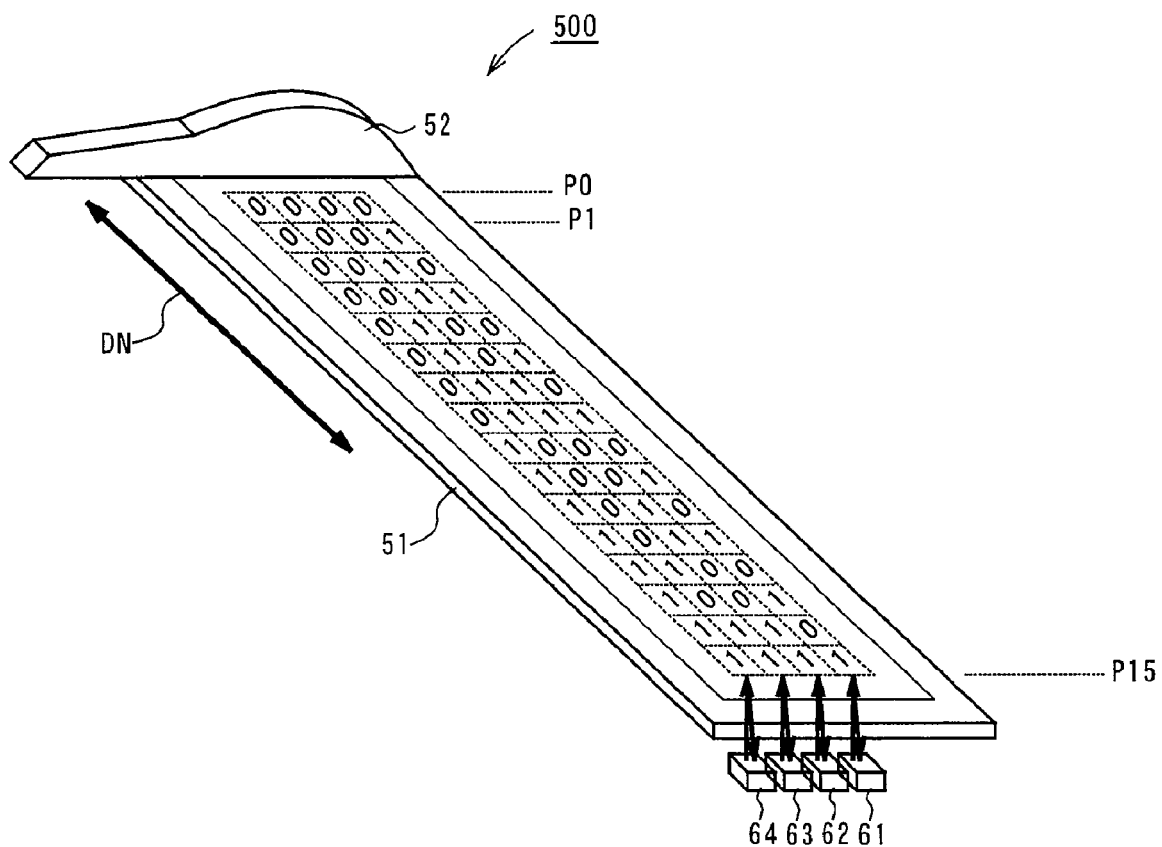
FIG. 11 is a diagram showing the conventional position detecting apparatus.

A position detecting apparatus 100 in FIG. 1 is used as a paper width detecting mechanism in an image processing apparatus 150 (MFP: Multi Function Peripheral) such as a scanner, a printer, or a copying machine. The position detecting apparatus 100 is structurally the same as the position detecting apparatus 500 in FIG. 11 explained above. The position detecting apparatus 100 includes a slide plate 11 serving as a moving mechanical member, a sheet guide 12 fixed to one end of the slide plate 11, bit mark reading sensors 21 to 24 (in this example, reflection sensors are used) arranged in a reading position near the other end of the slide plate 11; and a position deriving unit 25 made of an electronic circuit. In this example, binary numbers of four digits are appended to a lower surface of the slide plate 11 at fixed pitches (referred to as steps P0 to P15). It is assumed that the slide plate 11 can slide in a direction of an arrow DN.

Respective bits of the binary numbers of the four digits appended to the slide plate 11 are arranged in a direction orthogonal to the slide direction. Bits of a same digit of the respective binary numbers are arranged in parallel to the direction indicated by the arrow DN and in a linear shape at identical intervals. In other words, the respective bits of the binary numbers are arranged at intersections of four imaginary straight lines that extend in the slide direction DN at equal intervals on the surface of the slide plate and sixteen imaginary straight lines that are orthogonal to the four imaginary straight lines and extend at intervals of fixed pitches. In positions of the respective bits, "1" is displayed as a white bit mark and "0" is displayed as a black bit mark. The bits as a whole will be hereinafter referred to as a bit matrix. When logics indicated by two bit marks that belong to the same digit of the binary numbers in the bit matrix and are adjacent to each other in a front-to-back direction with respect to the slide direction of the slide plate 11 are opposite, a point between these bit marks is referred to as a bit change point.

In the case of FIG. 1, a not-shown fixed wall is provided at the other end of the slide plate 11. An original sheet or the like to be copied is placed between the sheet guide 12 and the fixed wall. The sheet guide 12 is slid in the direction of the arrow DN until both side edges of the original sheet come into contact with the sheet guide 12 and the fixed wall, respectively. In other words, the original sheet is held to be capable of slidingly moving between the sheet guide 12 and the fixed wall orthogonally to the arrow direction DN. In the case in which the position detecting apparatus 100 is operating, when the slide plate 11 is slid and a position of the sheet guide 12 is set to width of the original sheet, the sensors 21 to 24 read logics indicated by bit marks of the slide plate 11 facing the sensors 21 to 24. The position deriving unit 25 derives, on the basis of the logics read by the sensors 21 to 24, positions of the steps P0 to P15 indicated by binary numbers read. A host apparatus determines, for example, width of the held original sheet or the like on the basis of a result of the derivation.

In the example described above, positions of the slide plate 11 are represented by the binary numbers. The binary numbers are set to gray codes shown in FIG. 2. Because of a characteristic of the gray codes, only one bit of the binary numbers changes between steps adjacent to each other with respect to the slide direction DN. This difference can be easily understood if the binary numbers are compared with simple binary numbers in FIG. 2. The difference is the same even if digits of the binary numbers change. In detecting a position of the slide plate 11 that stops near a bit change point, since reading covers two steps, whichever value of bits that change at the bit change point is adopted, the position is detected as one of the steps adjacent to each other. Therefore, unlike the case in which the usual binary numbers are used, it is possible to basically prevent a situation in which a position entirely deviating from a correct position is detected because a reading position covers two steps.

For example, in the following explanation, the slide plate 11 stops such that a position near a boundary of the step P7 and the step P8 is a position facing the sensors 21 to 24 (a reading position). In the usual reading, the position can only take a value of "0100" or "1100". In other words, it is uncertain whether a logic of a bit of a fourth digit is read as "0" or read as "1". Therefore, a position of the slide plate 11 is judged as being located in the step P7 or the step P8 by the bit mark reading sensor. This indicates that an error between a position where the slide plate 11 actually stops and a position indicated by data read by the sensors 21 to 24 is kept within one step.

In the explanation of the example described above, the binary numbers have four digits. However, when higher accuracy is required, for example, it is necessary to increase digits of the binary numbers appended to the slide plate 11 to set pitches among steps of the binary numbers appended smaller. As the pitches are set smaller, for example, it is likely that play (back-lash) in a slide mechanism of the slide plate 11 causes a reading error. A state of occurrence of the error will be explained with reference to FIG. 3.

Figure 3:
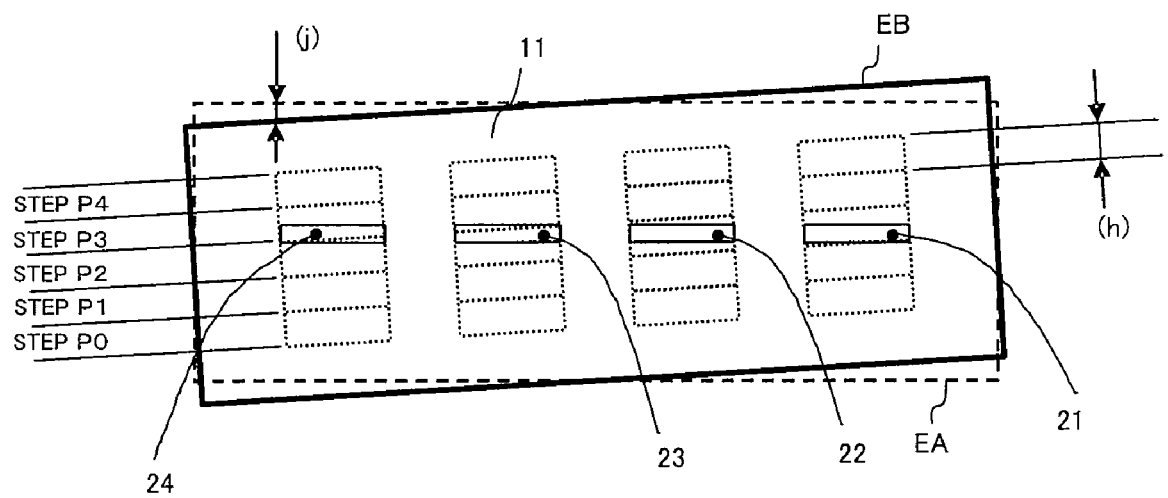
FIG. 3 is a diagram for explaining a reading error of binary numbers that occurs when the slide plate in FIG. 1 is slanted because of mechanical play.

In FIG. 3, "EB" indicates an outer edge of the slide plate 11 in the case in which the slide plate 11 is slanted in a range of play (back-lash) in the slide mechanism. "EA" indicates an outer edge of the slide plate 11 in the case in which the slide plate 11 is not slanted. In this case, "h" indicates height of bit marks colored in white or black. "j" indicates an amount of play of the slide plate 11 in the slide mechanism.

In FIG. 3, when the outer edge of the slide plate 11 is in a position indicated by "EB", the bit mark reading sensors 21, 22, and 23 read bit marks in the step P2. The bit mark reading sensor 24 reads a bit mark in the step P3. When positional deviation of reading occurs over the two steps adjacent to each other in this way, since the gray codes are used for the binary numbers representing a position of the slide plate 11, an error concerning a position to be determined can be kept within one step as described already.

However, when the play (j) of the slide mechanism is larger or when an amount of movement ("h" in FIG. 3) per one step is reduced in order to increase accuracy, even steps beyond the next step could be read. For example, a situation in which the sensor 21 reads a bit mark of the step P1, the sensors 22 and 23 read bit marks of the step P2, the sensor 24 reads a bit mark of the step P3, and reading of all the sensors cover the three steps could occur.

When reading of bit marks by the sensors 21 to 24 is over three steps as described above, it is impossible to keep a reading error within one step even if gray codes are used. Thus, in order to solve this problem, it is conceivable to reduce the play "j" in FIG. 3 or increase a step size "h". However, this is against the object that should be attained. Thus, a further improved method suitable for the expected object will be explained.

Figure 4:
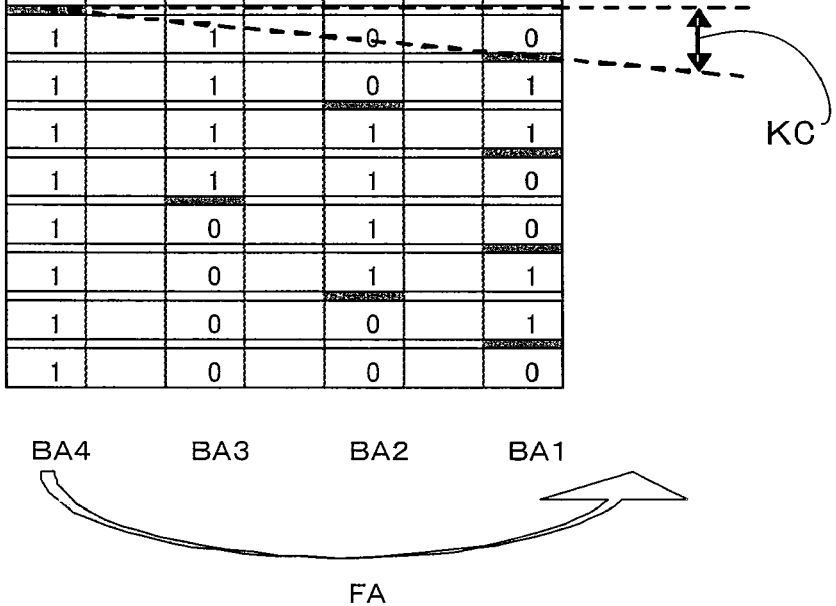
FIG. 4 is a diagram for explaining a minimum counter malfunction angle in the case in which bit strings are not rearranged in a bit matrix that uses gray codes.
Figure 5:
FIG. 5 is a diagram for explaining a minimum counter malfunction angle in the case in which a bit string in a fourth digit is rearranged to the right of a bit string in a first digit in the bit matrix shown in FIG. 4.

FIGS. 4 and 5 are diagrams showing a relation between the steps P0 to P15 in the improved method and binary numbers formed by gray codes indicating the steps. Overall display by bit marks appended to the surface of the slide plate 11 is referred to as a bit matrix. When logics indicated by two bit marks that belong to the same digit of the binary numbers in the bit matrix and are adjacent to each other in a front-to-back direction with respect to the slide direction of the slide plate 11 are opposite, a point between these bit marks (or bits) is referred to as a bit change point. In FIGS. 4 and 5, bit change points are indicated by bold lines.

In FIGS. 4 and 5, when it is assumed that an angle formed by a straight line connecting a first bit change point that belongs to a first digit and a second bit change point that belongs to a second digit different from the first digit and is adjacent to the first bit change point with respect to the moving direction of the slide plate 11 (referred to as an inter-mark connection slanted line) and a straight line orthogonal to the moving direction of the slide plate 11 is a counter malfunction angle, a smallest counter malfunction angle in the bit matrix using the gray codes shown in FIG. 4 is a minimum counter malfunction angle (KC). As this minimum counter malfunction angle KC is smaller, a reading error of sensors due to mechanical play more easily occurs.

As simple measures, as indicated by an arrow FA, a bit string BA4 of a fourth digit is moved to the right of a bit string BA1 of a first digit (replacement of bit strings) and a new bit matrix is created as shown in FIG. 5 and appended to the slide plate. Since a minimum counter malfunction angle (KD) in FIG. 5 is larger than the minimum counter malfunction angle (KC) in FIG. 4, a reading error by sensors less easily occurs. In other words, it is less likely that a reading error of sensors due to play of the slide mechanism occurs beyond the next step compared with the case in which bit strings are not replaced.

Figures 6, 7, 8:
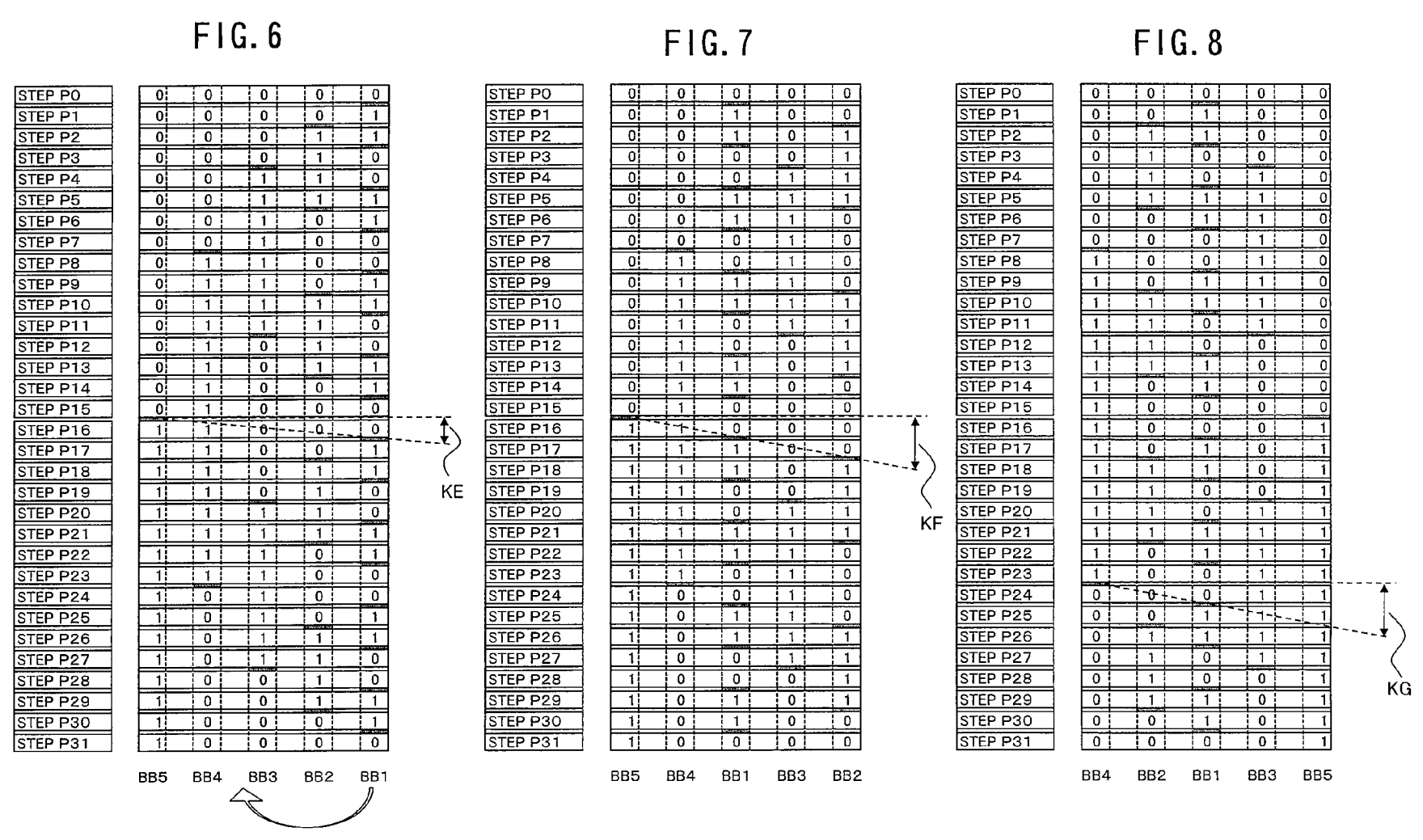

A simple method of performing more suitable setting of a bit matrix will be explained with reference to FIGS. 6 to 8. FIG. 6 shows a basic form of a bit matrix for detecting steps P0 to P31, which indicate respective positions of the slide plate 11, using binary numbers of five digits complying with the gray codes. A minimum counter malfunction angle is indicated by "KE". Replacement of bit strings BB1 to BB5 is applied to the bit matrix in FIG. 6 as described below. As shown in FIG. 7, the bit string BB1 having a largest number of bit change points is arranged in the center or in a position closest to the center (in this example, a position between the bit strings BB3 and BB4). In the case of FIG. 7, a minimum counter malfunction angle is represented as "KF". There are three bit change points on an inter-mark connection slanted line forming the minimum counter malfunction angle KF. In other words, in this case, it is likely that eight reading errors ($2^3=8$) occur. Then, the bit string BB2 having the second largest number of bit change points is arranged on the left (although the bit string BB2 is arranged on the left in this example, the bit string BB2 may be arranged on the right) of the bit string BB1. Subsequently, the bit string BB3 having the third largest number of bit change points is arranged. In that case, the bit string BB3 is arranged on the right of the bit string BB1 to face the bit string BB2 across the bit string BB1.

The bit string BB4 having a fourth largest number of bit change points is arranged on the left of the bit string BB2. The bit string BB5 having a fifth largest number of bit change points is arranged on the right of the bit string BB3. According to this replacement of the bit strings, the bit matrix changes to a bit matrix shown in FIG. 8. In FIG. 8, a minimum counter malfunction angle is indicated by "KG". The minimum counter malfunction angle KG is obviously larger than the minimum counter malfunction angle KE. Thus, malfunction due to play of the slide mechanism is less easily caused.

Although the minimum counter malfunction angle KG is the same as the minimum counter malfunction angle KF, there are only two bit change points on an inter-mark connection slanted line forming the minimum counter malfunction angle KG in FIG. 8. Therefore, even if errors occur in reading of bit marks, the number of the reading errors is only $2^2=4$. A probability of occurrence of errors is lower in the case of FIG. 8 than in the case of FIG. 7. In this example, the binary numbers used in the bit matrix have five digits. When digits of the binary numbers are increased in order to improve mechanical accuracy, bit strings of the respective digits only have to be rearranged near the center in an order from the bit string having a largest number of bit change points according to the same principle.

Therefore, in summary, it can be understood that a procedure described below only has to be performed as a procedure for selecting an optimum bit matrix. In a bit matrix that uses gray codes, a new bit matrix with bit strings replaced with one another is formed. In this case, characteristics of the gray codes is kept in that there is no relevance between a high order bit and a low order bit and the high order bit does not change in response to a change in the low order bit. No matter how bit strings are replaced, only one bit changes in steps adjacent to each other. Thus, among all new bit matrixes with bit strings replaced, a bit matrix having a largest minimum counter malfunction angle is selected. When there are plural bit matrixes having the largest minimum counter malfunction angle, a bit matrix further having no bit mark on an inter-mark connection slanted line is selected more preferentially than a bit matrix further having a bit mark on an inter-matrix connection slanted line. If the bit matrix selected in this way is appended to a slide plate as an optimum bit matrix, it is possible to manufacture a position detecting apparatus that less easily causes malfunction due to play and keeps the characteristics of gray codes.

Figure 9:
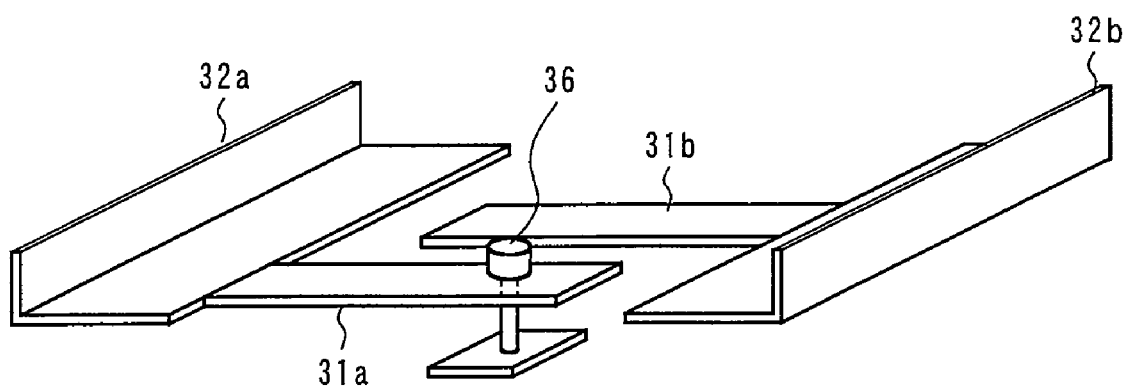
FIG. 9 is a diagram showing a second embodiment of the position detecting apparatus of the invention.
Figure 10:
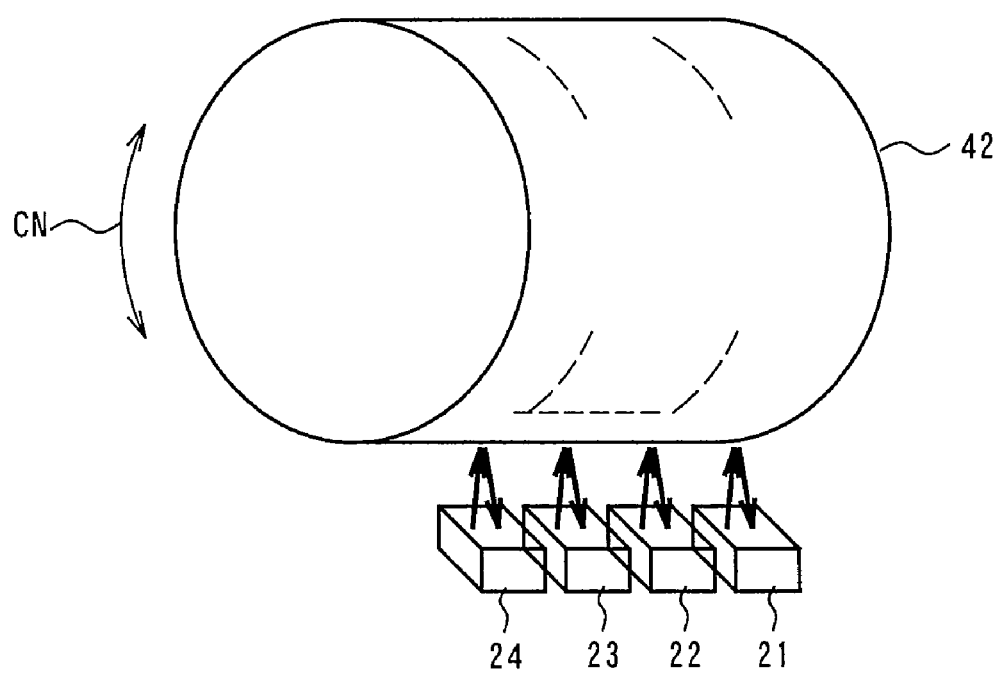
FIG. 10 is a diagram showing a third embodiment of the position detecting apparatus of the invention.

In the example explained above, one slide plate 11 is used. However, as shown in FIG. 9, two slide plates 31a and 31b are often used. The slide plates 31a and 31b mesh with a pinion gear 36. The slide plates 31a and 31b move in association with each other. Sheet guides 32a and 32b are attached to ends of the slide plates 31a and 32b, respectively. In this case, a bit matrix only has to be appended to one of the slide plates. It is also preferable to use this principle for arranging bit marks representing binary numbers at predetermined pitches in a rotating direction CN of a rotating body 42 as shown in FIG. 10 and detecting a rotating position of the rotating body 42 by reading the bit marks with the bit reading sensors 21, 22, 23, and 24.

As explained above, according to the position detecting apparatus of the invention, to make it possible to indicate a position of a moving mechanical member (e.g., a slide plate or a rotating body) with binary numbers, respective bits of the binary numbers are displayed as bit marks colored in different colors in accordance with logics represented by the respective bits. In this case, gray codes are used as the binary numbers appended to the mechanical member. By appending the bit matrix created in this way to the mechanical member, even if there is play in the mechanical member, it is possible to reduce an error in position detection compared with a bit matrix using simple binary numbers. In other words, even if the same mechanical member is used, it is possible to make appending pitches of binary numbers indicating positions of the mechanical member small. Moreover, by replacing a bit string belonging to the same digit of the binary numbers appended to the mechanical member with another bit string, it is possible to provide a position detecting apparatus that much less easily causes an error in reading of a position due to play of the mechanical member.

Further, by adopting a constitution including the position detecting apparatus according to this embodiment and an image processing unit that applies predetermined image processing such as image reading or image formation to a sheet guided by the mechanical member, a position in a predetermined moving direction of which is detected in the position detecting apparatus, it is possible to provide an image processing apparatus that realizes the advantages realized by the position detecting apparatus as described above.

What is claimed is:

1. A position detecting apparatus comprising:
   a mechanical member that moves in a direction set in advance;
   bit marks that indicate values of respective digits of binary numbers formed by gray codes appended at predetermined pitches to a surface of the mechanical member in order to indicate respective positions of the mechanical member with respect to the moving direction of the mechanical member;
   bit mark reading sensors arranged to be capable of simultaneously reading, every time the bit marks indicating the binary numbers formed by the gray codes appended to the surface of the mechanical member reach a reading position, the bit marks of the respective digits that reach the reading position; and
   a position deriving unit that derives a position of the mechanical member from values indicated by the bit marks of the respective digits obtained when the bit mark reading sensors simultaneously read the bit marks that reach the reading position
   wherein the bit marks indicating the respective digits of the binary numbers are appended at equal intervals in a direction orthogonal to the moving direction of the mechanical member and the bit marks are also appended at equal intervals for each of the digits of the binary numbers along the moving direction of the mechanical member
   wherein, when overall display by the bit marks appended to the surface of the mechanical member is a bit matrix and logics indicated by two bit marks that belong to a same digit of the binary numbers in the bit matrix and are adjacent to each other in a front-to-back direction with respect to the moving direction of the mechanical member are opposite, assuming that a point between these adjacent bit marks is a bit change point, a straight line connecting a first bit change point that belongs to a first digit and a second bit change point that belongs to a second digit different from the first digit and is adjacent to the first bit change point in the front-to-back direction with respect to the moving direction of the mechanical member is an inter-mark connection slanted line, and an angle formed by the inter-mark connection slanted line and a straight light orthogonal to the moving direction of the mechanical member is a counter malfunction angle, a smallest counter malfunction angle in one bit matrix is set as a minimum counter malfunction angle, minimum counter malfunction angles in all new bit matrixes created by replacing a bit string of any one of the digits with a bit string of the other digits are compared, a bit matrix having a minimum counter malfunction angle larger than minimum counter malfunction angles of the other bit matrix is selected as an optimum bit matrix, and the optimum bit matrix selected is appended to the surface of the mechanical member.

2. A position detecting apparatus according to claim 1, wherein, when plural optimum bit matrixes are present, a bit matrix further having no bit mark on the inter-mark connection slanted line is selected more preferentially than a bit matrix further having a bit mark on the inter-mark connection slanted line.

3. A position detecting apparatus according to claim 1, wherein the mechanical member is a flat slide plate, the bit marks are colored in white or black according to logics that should be displayed, and the bit mark reading sensors that read the bit marks are reflection sensors.

4. A position detecting apparatus according to claim 1, wherein the mechanical member is a flat slide plate, the bit marks are colored in white or black according to logics that should be displayed, and the bit mark reading sensors that read the bit marks are reflection sensors.

5. A position detecting apparatus according to claim 1, wherein the mechanical member is a rotating body of a drum shape that rotates around a center axis, bit marks appended to a surface of the rotating body are colored in white or black according to logics that should be displayed, and the bit mark reading sensors that read the bit marks are reflection sensors.

6. A position detecting apparatus according to claim 1, wherein mounting means for making it possible to mount the position detecting apparatus on an image processing apparatus to use the position detecting apparatus as a sheet width detecting apparatus for a sheet to be subjected to image processing in the image processing apparatus is attached to the position detecting apparatus.

7. An image processing apparatus, comprising: a position detecting apparatus according to claim 1; and an image processing unit that applies predetermined image processing to a sheet guided by a mechanical member, a position in a predetermined moving direction of which is detected in the position detecting apparatus.

8. A position detecting apparatus comprising:
   a mechanical member that moves in a direction set in advance;
   bit marks that indicate values of respective digits of binary numbers formed by gray codes appended at predetermined pitches to a surface of the mechanical member in order to indicate respective positions of the mechanical member with respect to the moving direction of the mechanical member;
   bit mark reading sensors arranged to be capable of simultaneously reading, every time the bit marks indicating the binary numbers formed by the gray codes appended to the surface of the mechanical member reach a reading position, the bit marks of the respective digits that reach the reading position; and a position deriving unit that derives a position of the mechanical member from values indicated by the bit marks of the respective digits obtained when the bit mark reading sensors simultaneously read the bit marks that reach the reading position wherein, when overall display of bit marks appended to the surface of the mechanical member is a bit matrix and logics indicated by two bit marks that belong to a same digit of binary numbers in the bit matrix and are adjacent to each other in a front-to-back direction with respect to the moving direction of the mechanical member are opposite, assuming that a point between the bit marks is a bit change point, a bit matrix with bit strings replaced is appended to the surface of the mechanical member, the bit strings being replaced such that a first bit string having a largest number of bit change points and a second bit string having a second largest number of bit change points among bit strings of the respective digits of the binary numbers are arranged to be adjacent to each other and a third bit string having a third largest number of bit change points is arranged on a side opposed to the second bit string with the first bit string in the center and such that the bit strings occupy a position close to the first bit string in order from a bit string having a largest number of bit change points.

9. A position detecting apparatus according to claim 8, wherein the mechanical member is a flat slide plate, the bit marks are colored in white or black according to logics that should be displayed, and the bit mark reading sensors that read the bit marks are reflection sensors.

10. A position detecting apparatus according to claim 8, wherein the mechanical member is a flat slide plate, the bit marks are colored in white or black according to logics that should be displayed, and the bit mark reading sensors that read the bit marks are reflection sensors.

11. A position detecting apparatus according to claim 8, wherein mounting means for making it possible to mount the position detecting apparatus on an image processing apparatus to use the position detecting apparatus as a sheet width detecting apparatus for a sheet to be subjected to image processing in the image processing apparatus is attached to the position detecting apparatus.

12. An image processing apparatus, comprising: a position detecting apparatus according to claim 8; and an image processing unit that applies predetermined image processing to a sheet guided by a mechanical member, a position in a predetermined moving direction of which is detected in the position detecting apparatus.

* * * * *